May 31, 1955  J. T. VAN BRUGGEN ET AL  2,709,671
PROCESS OF PRODUCTION OF A SYNTHETIC THYROPROTEIN
Filed March 12, 1953.
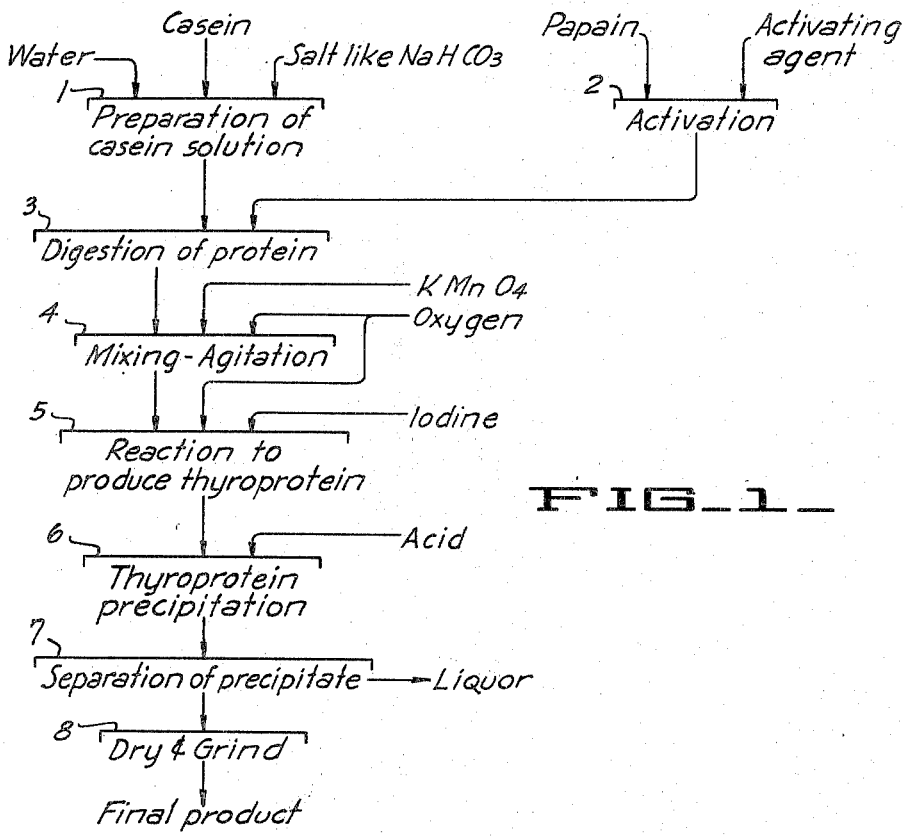
FIG_1_
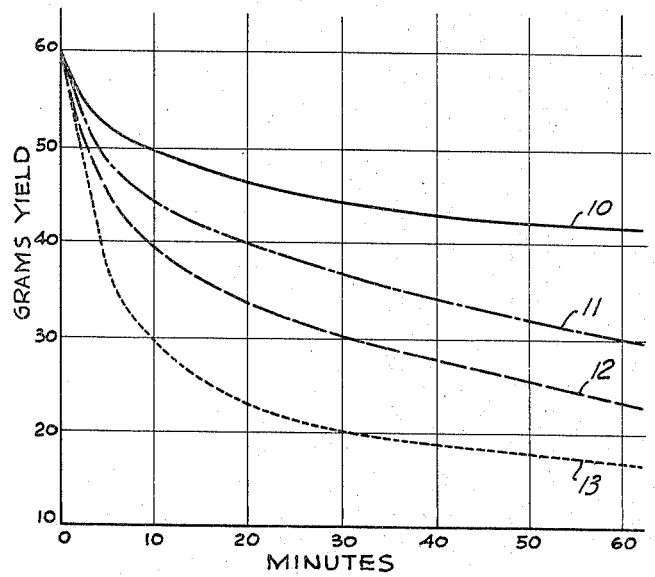
FIG_2_
INVENTORS
John T. Van Bruggen
Edward S. West
BY
ATTORNEYS

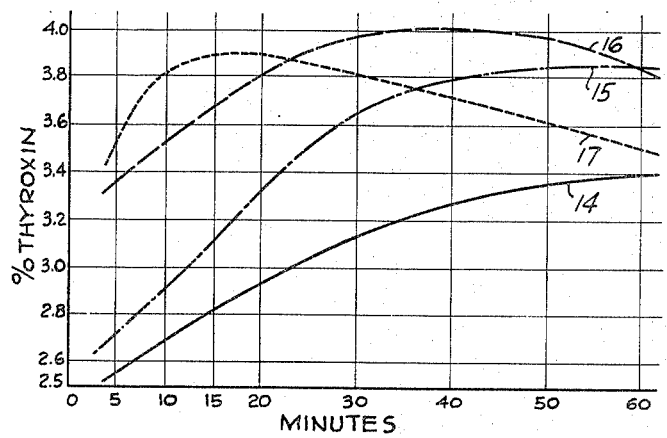
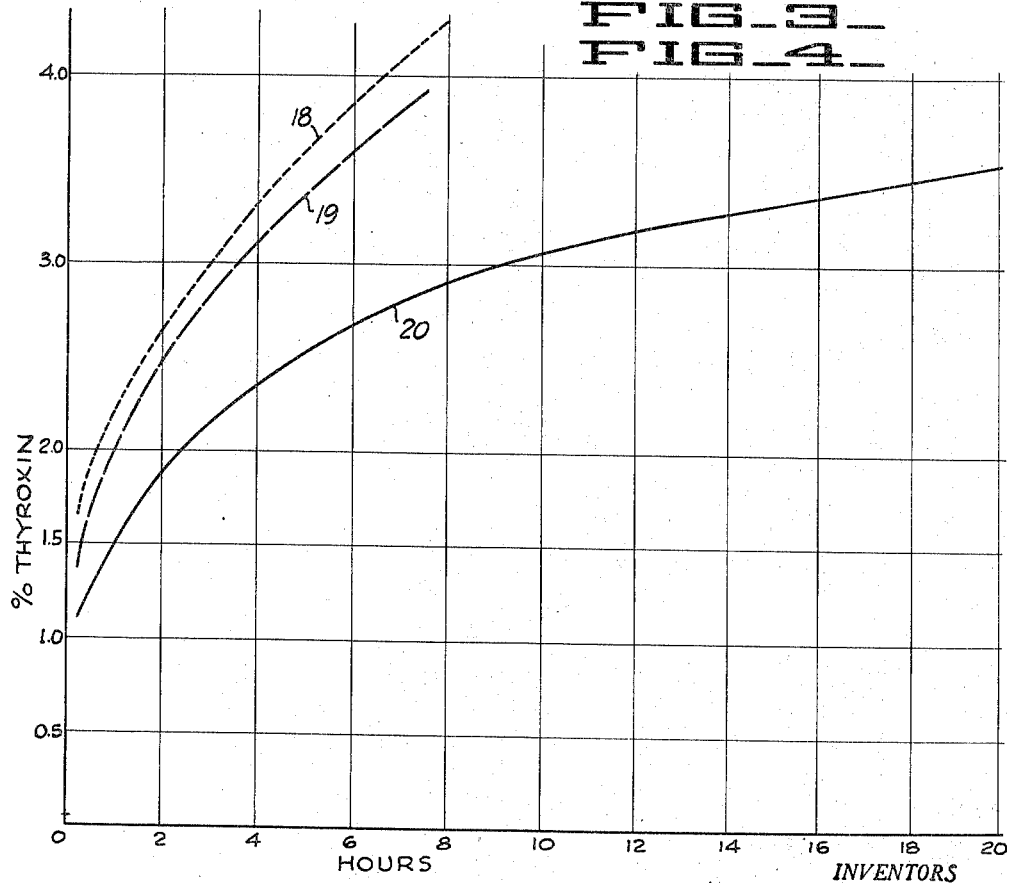
FIG_3_
FIG_4_

United States Patent Office 2,709,671
Patented May 31, 1955

2,709,671

PROCESS OF PRODUCTION OF A SYNTHETIC THYROPROTEIN

John T. Van Bruggen and Edward Staunton West, Portland, Oreg.

Application March 12, 1953, Serial No. 341,988

5 Claims. (Cl. 195—12)

This invention relates generally to methods for the production of synthetic thyroprotein such as are suitable for use in animal feed supplementation. The present application is a continuation in part of our applications, Serial No. 113,235 filed August 30, 1949, now abandoned, and 165,726, filed June 2, 1950, now abandoned.

In our copending application Serial No. 156,374, filed April 17, 1950, now Patent No. 2,642,426, we have disclosed a commercially practical method for the production of synthetic thyroprotein, which will yield a product of reasonably high potency. The method in that instance involves reaction of casein in solution with iodine in the presence of oxygen and a catalyst, at an elevated temperature. In the commercial use of that process it is feasible to obtain a thyroprotein product having a potency ranging from 3.0 to 4.0 percent thyroxin content, but this necessitates reaction times ranging from about 9 to 20 hours or more. It will be evident that there is a close relationship between cost of manufacture and time of reaction, particularly because the time of reaction places limitations upon the capacity of a given plant equipment.

It is an object of the present invention to provide an improved process of the above character for the manufacture of synthetic thyroprotein which will make possible the production of a product having relatively high potency.

Another object of the invention is to provide a process of the above character which will provide a product of a desired potency in a relatively short reaction time.

Additional objects and features of the invention will appear from the following description in which the preferred embodiments of the invention have been set forth in detail in conjunction with the accompanying drawing.

Referring to the drawing:

Figure 1 is a flow sheet illustrating one procedure for carrying out the present process.

Figure 2 is a graph serving to illustrate the effect of varying the amounts of activated papain used for digesting the casein.

Figure 3 is a graph showing the effect of various digesting times upon the process.

Figure 4 is a graph illustrating the potencies obtained by use of the present process, as compared to a process such as disclosed in copending application Serial No. 156,374.

In general the present process involves the predigestion of the tyrosine-containing protein by the action of a proteolytic enzyme. The partially digested protein is then treated by an iodination and oxidative coupling process such as disclosed in our aforesaid application Serial No. 156,374. By the use of a partially digested tyrosine-containing protein, relatively high potencies are obtained with short reaction times.

One procedure for carrying out our method is illustrated in the flow sheet of Figure 1. In step 1 a tyrosine-containing protein such as casein is dissolved in water together with an alkaline agent such as sodium bicarbonate. In step 2 a proteolytic enzyme, particularly papain is treated with an activating agent, and in step 3 the activated papain is intermixed with the casein solution, and permitted to react for partial digestion of the protein. In step 4 the partially digested protein solution is intermixed with an agent like potassium permanganate. It is desirable at this time, and throughout the subsequent reaction, to sparge or otherwise bubble air or oxygen through the solution.

Following intermixture of potassium permanganate with the partially digested protein solution, the material is intermixed in step 5 with iodine, and held at such temperatures as to cause reactions to take place for the formation of thyroxin. These reactions will be presently described in detail. As previously mentioned sparging with air or oxygen is continued in step 5.

After the reaction in step 5 has been carried out to the extent desired, the material is permitted to cool and in step 6 acid is introduced to effect isoelectric precipitation. The precipitated protein is removed as indicated in step 7, and is dried and ground to form the final thyroprotein product.

Although casein is a suitable and convenient protein to use in our process, it is possible to use other tyrosine containing proteins, such as corn gluten, silk fibroin, or soy protein.

Satisfactory solution of the casein can be best effected in an alkaline solution having a pH value somewhat above pH 7.0, as for example from about 7.5 to 8. Any suitable alkaline agent can be used for pH adjustment. We prefer, however, to make use of an alkaline buffer salt, such as sodium carbonate, sodium bicarbonate, potassium carbonate, potassium bicarbonate, or mixtures thereof. Sodium bicarbonate gives good results and is suitable for commercial use. Dissolution of the casein is facilitated by using water at an elevated temperature of the order of from 145 to 155° F. The concentration of the casein solution may vary somewhat, but it is satisfactory to use concentrations of the order of from 30 to 75 grams of casein per liter of water.

It is possible to use ordinary commercial papain without activation. However, activation has been found to be of distinct benefit in securing the results desired. Instead of preparing a freshly activated solution it is possible to purchase a commercial form of activated papain, as for example the material known by the tradename of "Caroid." Freshly activated papain has been found superior to the commercial activated material, and can be readily prepared without undue expense.

To prepare freshly activated papain, an activating agent like hydrogen sulfide is dissolved in water and ordinary papain (e. g. papain dispersed in glycerin) introduced into this solution. The process is not critical with respect to the amount of papain used, but it is normally satisfactory to use from 1.0 to 10.0 gm. of commercial papain, for each liter of water. For suitable activation the solution with the papain can be held for a period of from 5 to 60 minutes, at a temperature of the order of from 50 to 100° F. The amount of hydrogen sulfide used can be sufficient to provide a substantially saturated aqueous solution. After this treatment the papain is in highly activated condition, and may be intermixed with the protein solution in step 3.

As is known to those familiar with enzymic reactions, other agents can be used for activating papain. Thus it is possible to use cyanogen compounds such as sodium or potassium cyanide. Although such agents, and to a lesser degree hydrogen sulfide, are somewhat toxic all but immaterial traces are removed during the process because of subsequent aeration and acidulation.

Assuming that the papain is activated by use of hydrogen sulfide in the manner described above, it is satisfactory to use from 5 to 100 cc. of such papain solution with each liter of protein solution. During digestion in step 3 the material is held at a suitable temperature such as from 140 to 160° F., and the reaction can be extended for periods of from 5 minutes to 1 hour, depending upon the extent to which it is desired to digest the protein. As will be presently explained, an increase in the amount of papain used for a given quantity of casein solution reduces the time period required for a given digestion of the protein.

As previously indicated, in step 3 the casein is not completely digested. We specifically limit digestion to a degree wherein the bulk of the protein remains capable of isoelectric precipitation.

Papain is inactivated by oxidation and therefore the digesting action of the papain is concluded in step 4, because of the presence of potassium permanganate and oxygen. Potassium permanganate is a very efficient oxidizing agent and is reduced almost immediately upon intermixture with the protein solution. The rapid although brief instantaneous oxidation effected by the potassium permanganate serves to precondition the reactants for more efficient participation in the subsequent reaction. In addition, by reducing the potassium permanganate while it is completely dispersed throughout the solution, very fine particles of catalyst material are deposited intimately throughout the protein molecules. These freshly made oxides of manganese formed in minute particles equally dispersed throughout the solution, serve well as oxidizing catalysts during the reaction.

The amount of potassium permanganate added in step 4 can be within the range of about $\frac{1}{16}$ to $\frac{1}{4}$ pound to 300 pounds of casein used. While it is more convenient to add the potassium permanganate as a concentrated aqueous solution, it can be added in crystalline form.

Although it is desirable to use potassium permanganate, for reasons previously explained, it is possible to use various oxides of manganese including $MnO$, $MnO_2$, $Mn_2O_3$, $Mn_3O_4$ and other oxides formed by the reduction of potassium permanganate.

At the beginning of step 5 the material can be at a temperature of the order of from 150 to 170° F. Within this temperature range iodine can be added to the solution and intermixed therewith, without serious volatilization. The amount of iodine used should be sufficient for the required reaction, without leaving an excess of free iodine in the final product. In general, for each 60 grams of casein, about 9 to 12 grams of iodine can be used. Addition of the iodine can be carried out within a period of from 15 to 30 minutes.

In step 4, or at the start of step 5, it is desirable to adjust the pH of the solution to a value of the order of pH 9 to 10. Preferably this is done by introducing small amounts of an alkaline buffer salt, such as any one of the buffer salts previously mentioned. This pH adjustment should be made prior to proceeding with the main reaction to produce thyroprotein.

Immediately after the introduction of iodine has been completed in step 5, the temperature of the solution is raised to a value of from 180 to 190° F., and held at such level while agitation and sparging continues. Reactions take place at this time for formation of thyroxin. The time of the reaction can be controlled in accordance with the thyroprotein potency required.

As explained in our aforesaid copending application Serial No. 156,726 the reaction in step 5 is essentially one involving oxidative coupling of the di-iodo tyrosine molecules to form thyroxin. A predigested tyrosine-containing protein serves as a starting material for the formation of molecules of di-iodo tyrosine which are oxidatively coupled to form thyroxin. By the predigestion of the tyrosine-containing protein it is possible that the tyrosine molecules are recombined in closer proximity to one another and thereby enhance the coupling of di-iodo tyrosine groups to form larger amounts of protein bound thyroxin during the reaction period. In any event there is a marked decrease in the reaction time required to carry out the reaction to a desired degree. In other words the desired reaction is greatly facilitated by pre-treatment of the casein.

Upon terminating the reaction in step 5, the solution can be cooled to a temperature of the order of from 130 to 160° F., and oxygen sparging is discontinued. However, it is desirable to continue mechanical agitation during the subsequent precipitating step 7. Isoelectric precipitation can be carried out by methods well known to those familiar with the precipitation of casein. Suitable acids can be used for this purpose, such as hydrochloric. Mechanical agitation during precipitation tends to produce curds of finer size.

As previously pointed out, during precipitation any papain activating agent remaining in the solution is released, and does not find its way into the final precipitated product.

One example of our process is as follows: Using a stainless steel jacketed open tank 600 gallons of water were introduced at a temperature of 150° F. The tank was fitted with two motor driven mechanical agitators capable of providing vigorous agitation to the liquid in the tank. With the hot water under vigorous agitation 75 pounds of sodium bicarbonate were added and quickly dissolved. Into this solution was slowly added 300 pounds of dry casein. In order to prevent excessive foaming at this point, a small quantity, about 150 cc., of an anti-foam emulsion was added. Then approximately 2.5 pounds of papain was added and the solution agitated for about 30 minutes. The particular papain used was an activated one, purchased under the trade name of "Caroid." The papain was added as a suspension in glycerin. The solution was then raised to a temperature of 168° F., oxygen sparging was commenced, and one quart of water solution containing approximately $\frac{1}{8}$ pound of potassium permanganate was added. After addition of the potassium permanganate, with continued agitation and oxygen sparging, 50 pounds of iodine crystals were added at a rate compatible with adequate dispersion of the crystals throughout the solution, which required from 15 to 30 minutes. Heat was then applied to the outer jacket of the tank to bring the contents to the temperature of 183° F., over a period of about 30 minutes, and the tank was then held up at this temperature, with continued agitation and sparging, for a period of 10 hours. The volume within the tank was kept constant throughout the reaction by adding additional water as required. After 10 hours the oxygen sparging was discontinued and the contents of the tank drained to another tank to cool under constant agitation. When the solution had cooled to a temperature of 155° F., the proteinaceous material was precipitated by the addition of hydrochloric acid. Sufficient acid was added to reduce the pH to a value of about 3.9. The solution was cooled to 120° F. before agitation was stopped and the precipitate allowed to settle. After settling the upper liquid was decanted and the remaining curd put through a centrifuge and spun dry. After spin drying, the curds were placed on trays and oven-dried for 6 hours, after which time the material was ground to a very fine consistency and bagged. The final product had a potency of about 4.0 to 5.0 percent pure thyroxin.

The following second example of our process demonstrates the advisability of using freshly activated papain.

The casein solution was prepared in the same manner as in Example 1, except that only 20 pounds of sodium bicarbonate were used in place of 75 pounds. A lesser amount of papain, viz. 1.0 pound, was added to 5 gallons of water at a temperature of 100° F. and through which hydrogen sulfide had been bubbled to form a saturated solution. After holding the papain in the hydrogen sulfide solution for a period of 45 minutes, this material was added to the casein solution, and this material agitated and held for a period of 30 minutes at 145° F. for digestion of the protein. An additional 55 pounds of sodium bicarbonate was then added and dissolved, the solution heated to a temperature of 168° F., oxygen sparging commenced, and the process continued in the same manner as described before for the first example, except that the reaction time was limited to 8 hours. The final product was obtained at a potency of about 4.2 percent pure thyroxin.

It should be kept in mind that although predigestion of the casein with activated papain makes possible relatively high potency in a short reaction time, it does have the effect of somewhat decreasing the overall yield of precipitated material. Thus the overall yield is dependent upon the degree to which the protein is digested and this in turn is dependent upon the time during which digestion is permitted to proceed and the amount of papain used for digestion. The curves of Figure 2, which were made as a result of laboratory tests, demonstrate these relationships. Curves 10, 11, 12 and 13 were plotted respectively for 100, 250, 500 and 1,000 mg. of papain for a given casein solution. The vertical axis represents the yield in terms of grams of precipitated material, and the horizontal axis represents the time of digestion. Note that all of the curves slope downwardly, showing that the yield is reduced as the digestion time is increased. Also the positioning of the respective curves shows that as the amount of activated papain is increased, the yield decreases.

The curves of Figure 3 were prepared from the same laboratory data. Curves 14, 15, 16 and 17 represent use respectively of 100, 250, 500 and 1,000 mg. of papain. The vertical axis represents percentage thyroxin in the final product and the horizontal axis represents time for digestion of the casein, the same as in Figure 2. Note that curve 14 rises gradually to a peak at about 60 minutes' digestion time. At the peak of this curve the potency is about 3.4 percent, which is suitable for many commercial operations. Curve 15 reaches a potency of 3.4 percent in a digestion time of about 22 minutes. This curve commences to level out for a digestion time of about 40 minutes. Curve 16 reaches a potency of 3.24 in a little over 5 minutes, and commences to level off beyond about 30 minutes. This curve has a definite peak at about 40 minutes, and thereafter drops downwardly. Curve 17 provides a potency of about 3.5 in about 5 minutes' digestion time, and then rises rapidly to a peak for a digestion time of 15 minutes. Thereafter the curve slopes downwardly.

The curves of Figure 4 contrast our present process, using freshly activated papain, with a process as disclosed in our copending application Serial No. 156,374, in which casein is directly reacted without digestion. Curves 18 and 19 represent the present process, and were obtained from different runs. Curve 20 represents the process of our said copending application. The vertical axis in this instance represents percent thyroxin in the final product, and the horizontal axis represents the total period of reaction in step 5. Note that without digestion of the casein solution, a reaction time in excess of 9 hours was required for a potency in excess of 3.1 percent. However, for the present process, using freshly prepared activated papain for predigestion of the protein, the same potency of 3.0 percent was reached after reaction times of the order of from 3.5 hours. With a reaction time of 8 hours potencies of the order of 4.0 to 4.5 percent were obtained as distinguished from a potency of less than 3.0 without digesting the protein.

In commercial operations for the manufacture of thyroprotein, it is considered desirable to produce the potencies of at least about 3.0 percent. It is evident that with the present process such potencies can be obtained with reaction times less than required without predigestion of the protein. However considerably higher potencies can be made without unduly extended reaction times.

The characteristics of the products indicated by the curves in Figures 2 and 3 should be taken into account in determining the amount of papain to be used and the time used for digesting the casein. Assuming that high potencies are desired, then it is desirable to use larger amounts of papain, with the time period of digestion extended to take into account the curves of Figure 3. Use of smaller amounts of papain may be desirable where one wishes to obtain a good yield, without reaching the higher potencies made possible by greater amounts of papain. When using amounts of papain as indicated by curves 16 and 17, it is evident that because of the peaks, the time period for digestion should be shortened accordingly for most economical operation.

We claim:

1. In a method for producing synthetic thyroprotein which includes forming an alkaline aqueous solution of tyrosine-containing protein having a pH between approximately 8 and 9 and an amount of protein between 50 and 75 grams per liter of solution, incorporating a manganese oxide catalyst into said solution in an amount equivalent to $\frac{1}{16}$ to $\frac{1}{4}$ pound of potassium permanganate per 300 pounds of said protein, adding iodine to said solution in an amount equivalent to 9 to 12 grams per 60 grams of protein while said solution is at a temperature of from 150 to 175° F., said iodine being added over a period of from 15 to 30 minutes, continuously agitating and sparging the solution with oxygen beginning before the introduction of said iodine, increasing the temperature of the solution to from 180 to 190° F., as soon as substantially all of the iodine has been added and continuing said agitation and sparging with oxygen at the last-named temperatures until the product contains the desired thyroxine content, the improvement which comprises incorporating activated papain in said alkaline aqueous solution before incorporating said catalyst and before said sparging and retaining the resulting solution at a temperature of from 140 to 160° F. for a period sufficient to effect partial digestion of the protein.

2. The method as defined in claim 1 in which the protein subjected to partial digestion is casein.

3. The method as defined in claim 2 in which the amount of said papain ranges from 0.5 to 5 pounds per 300 pounds of casein and the time of treatment at 140 to 160° F. is 5 minutes to one hour.

4. The method as defined in claim 1 in which the agitation and sparging at said temperature of 180 to 190° F. is from 6 to 10 hours and the resulting mixture is cooled to a temperature from 130 to 160° F. and acidulated to the isoelectric point to precipitate thyroprotein.

5. A method as in claim 1 in which the papain immediately before its use in the process is freshly activated by dispersing it in an aqueous solution of hydrogen sulfide and by holding it in such solution for a period of about 5 to 60 minutes at a temperature of the order of from 50 to 100° F.

References Cited in the file of this patent

UNITED STATES PATENTS

Re. 23,429    Turner et al. _____ Nov. 13, 1951